Figure 1:
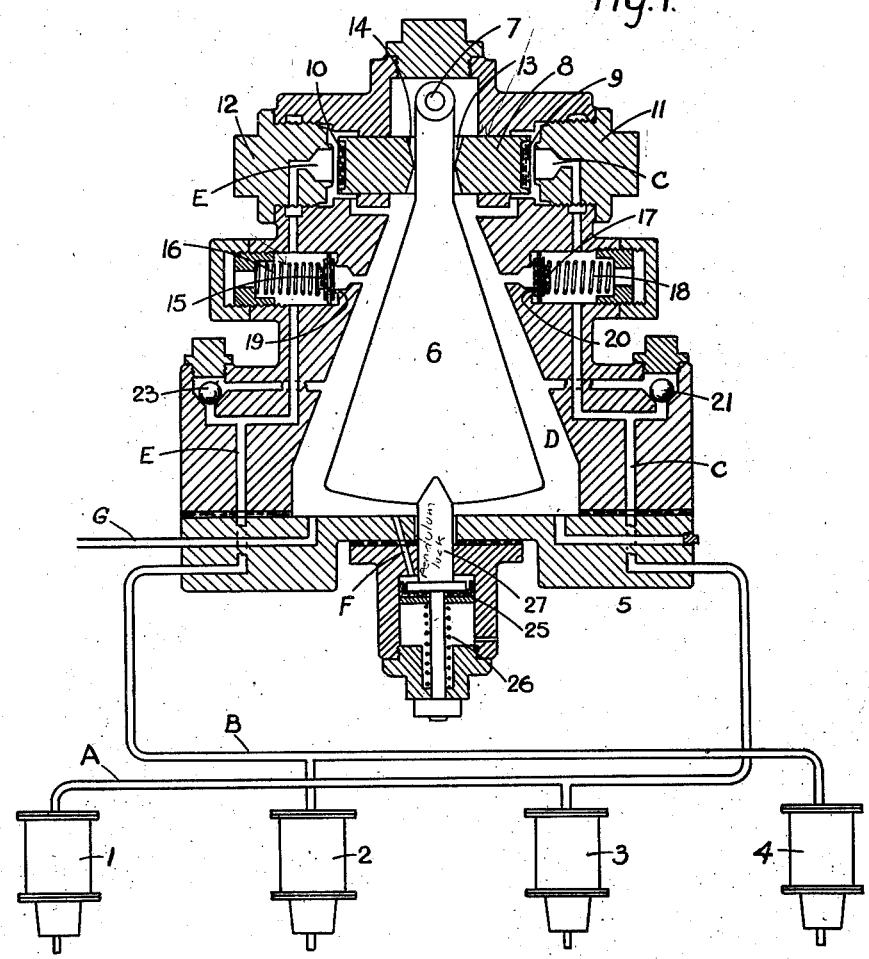

July 27, 1937.  J. WHITE  2,088,184

BRAKING APPARATUS FOR RAILWAY AND OTHER VEHICLES

Filed Oct. 25, 1935

INVENTOR
JOSEPH WHITE
BY *Wm. M. Cady*
ATTORNEY

Patented July 27, 1937

2,088,184

UNITED STATES PATENT OFFICE 2,088,184

BRAKING APPARATUS FOR RAILWAY AND OTHER VEHICLES

Joseph White, Concord, near Sydney, New South Wales, Australia, assignor to The Westinghouse Air Brake Company, Wilmerding, Pa., a corporation of Pennsylvania Application October 25, 1935, Serial No. 46,654
In Great Britain October 27, 1934

27 Claims. (Cl. 303—24)

This invention relates to a vehicle brake equipment and more particularly to vehicle brake control apparatus adapted to control the brakes of a vehicle to produce different braking effects on the wheels carried by different axles of the vehicle.

As usually constructed the cars employed in railway service have a body supported adjacent each end by trucks each of which has a plurality of axles. The body is usually pivotally connected to the trucks at points located a substantial distance above the rails on which the wheels of the truck rest, while the center of gravity of the car bodies and the loads carried thereby is substantially above the points of connection between the car body and the car trucks.

As the car body is connected to the trucks at points substantially above the points of engagement of the wheels of the truck with the rails, when the brakes are applied to the vehicle wheels and the vehicle decelerates in speed, the wheels on the leading axle of each truck resist movement of the truck, while the inertia of the body of the car operating through the pivotal connection between the body and the truck causes the truck to lift slightly at the rear, thereby reducing the load on the wheels of the trailing axle and also increasing the load on the wheels of the leading axle of the truck. As a result of these changes in the load on the leading and trailing axles of the truck the adhesion between the wheels carried by these axles and the rails varies considerably from that of the vehicle at rest.

In addition to the shifting of the load from one of the axles of a truck to the other of the axles of the same truck, there is a tendency, because the center of gravity of the car body and the load carried thereby is above the points of connection of the car body with the trucks, for the weight of the car body to be shifted from the trailing truck to the leading truck while the car or vehicle is decelerating as a result of an application of the brakes.

The adhesion between a wheel and a rail varies with the load on the wheel and the adhesion between the wheels of the vehicle and the rails on which they operate is varied during a stop because of the shifting of the load between the axles of each truck of the vehicle and also because of the shifting of the load between the trucks of the vehicle.

In the brake equipments now in use the braking forces applied to the wheels are limited so that the maximum braking force developed will not cause the wheels on the trailing axles of the vehicle trucks to slide. As a result the maximum possible braking effect on the wheels of the leading axles is not developed and, therefore, these vehicles are not retarded at the maximum rate.

If railway cars always operated in the same direction this problem could be overcome by designing the brake equipment so that the braking force applied to each wheel is proportioned to the adhesion between the wheel and the rail under service conditions. However, this arrangement is not practicable as most railway cars are operated in both directions.

It is an object of this invention to provide a vehicle brake equipment incorporating means responsive to the direction of movement of the vehicle for varying the braking effect produced on the leading and trailing wheels of each of the trucks of the vehicle.

A further object of the invention is to provide a fluid pressure brake equipment for a vehicle, the brake equipment including separate brake cylinders for the shoes associated with the wheels at the opposite ends of a truck of the vehicle, and having inertia responsive means for varying the pressure developed in the brake cylinders in accordance with the direction of travel of the vehicle.

Another object of the invention is to provide a fluid pressure brake equipment for a vehicle, the brake equipment including a plurality of brake cylinders which are arranged to control the brakes on the wheels on different ones of the axles of the vehicle, and having means responsive to inertia and operated on a predetermined increase in the pressure of the fluid supplied to the brake cylinders to vary the pressure of the fluid supplied to different ones of said brake cylinders in order to produce different degrees of braking effect on the wheels associated with different ones of the vehicle axles in accordance with the direction of movement of the vehicle.

A further object of the invention is to provide a brake equipment for a vehicle having a truck adjacent each end, each of the trucks having a plurality of axles, the brake equipment having means responsive to the direction of movement of the vehicle for varying the braking effect produced on each of the vehicle trucks and for also varying the braking effect on the axles of each of the trucks.

Another object of the invention is to provide an improved fluid pressure brake equipment for a vehicle.

Figure 2:
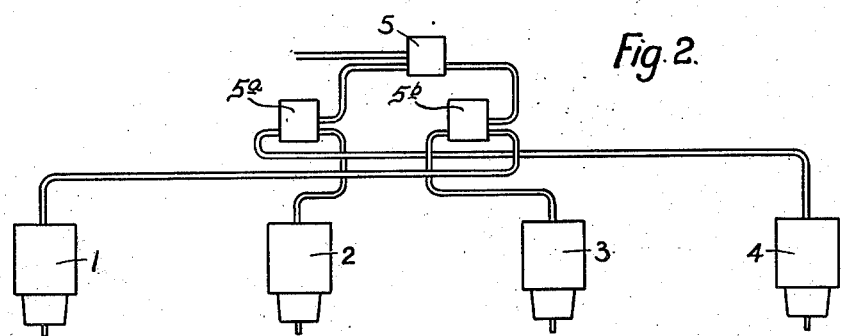

Other objects of the invention and features of novelty will be apparent from the following description taken in connection with the accompanying drawing, in which Fig. 1 is a diagrammatic view, largely in section, of a portion of a vehicle brake equipment embodying my invention, and Fig. 2 is a diagrammatic view of another form of brake equipment embodying my invention.

Referring to Fig. 1 of the drawing, the vehicle brake equipment therein illustrated comprises a plurality of brake cylinders 1, 2, 3, and 4, and an inertia operated valve device indicated generally by the reference numeral 5 for controlling the pressure of the fluid supplied to the brake cylinders.

The brake cylinder 1 is arranged to control the brakes on the wheels on the axle at one end of one of the trucks of the vehicle, while the brake cylinder 3 controls the brakes on the wheels on the axle at the same end of the other truck of the vehicle. The brake cylinders 2 and 4 control the brakes on the axles at the other ends of the vehicle trucks.

The brake cylinders 1 and 3 are connected together by means of a pipe A which is connected to a passage C in the inertia responsive valve device 5, while the brake cylinders 2 and 4 are connected by way of a pipe B which is connected to a passage E in the inertia responsive valve device 5.

The inertia responsive valve device 5 comprises a casing having a chamber D therein in which is mounted a pendulum 6. The chamber D is constantly connected by way of a passage and pipe G with a brake controlling valve device, not shown, which controls the supply and release of fluid under pressure to and from the brake cylinders.

The pendulum 6 is pivotally supported on a pin 7 and extends through an opening in a valve 8 which is reciprocally mounted in a bore in the body of the valve device 5. The valve 8 has mounted in a recess in one end thereof a sealing gasket 9 which is adapted to engage a seat rib formed on the plug 11 and surrounding the end of the passage C, while the other end of the valve 8 has a sealing gasket 10 positioned in a recess therein and adapted to engage a seat rib formed on the plug 12 and surrounding the end of the passage C.

The valve 8 has formed thereon fulcrum points 13 and 14 which are adapted to engage opposite faces of the pendulum 6 on movement of the pendulum away from the normal position.

The body of the inertia responsive valve device 5 has a chamber formed therein which is in constant communication with the passage E, and in which is mounted a valve 15 which is urged by means of a coil spring 16 into engagement with a seat rib 19 surrounding a passage which communicates with the chamber D.

The body of the inertia responsive valve device 5 has another chamber formed therein which is in constant communication with the passage C, and in which is mounted a valve 17 which is urged by means of a coil spring 18 into engagement with a seat rib 20 surrounding a passage which communicates with the chamber D.

The body of the inertia responsive valve device 5 has, in addition, a chamber formed therein which is in constant communication with the chamber D and which contains a ball check valve 21 which is adapted to engage a seat surrounding a passage communicating with the passage C so as to prevent the flow of fluid from the chamber D to the passage C past the check valve, but to permit the flow of fluid from the passage C to the chamber D past the check valve.

The body of the inertia responsive valve device 5 has, in addition, a chamber formed therein which is in constant communication with the chamber D and which contains a ball check valve 23 which is adapted to engage a seat surrounding a passage which communicates with the passage E. The ball check valve 23 is adapted to permit fluid under pressure to flow from the passage E to the chamber D and to prevent the flow of fluid from the chamber D to the passage E past the check valve.

The fluid pressure operated valve device 5 has a body section associated therewith having a bore therein in which is mounted a movable abutment in the form of a piston 25, which is subject on one side to the pressure of the fluid in a chamber which communicates by way of a passage F with the chamber D, and is subject on the other side to the pressure of a coil spring 26.

The piston 25 has associated therewith a stem 27 which extends through a bore in the body of the valve device and has a pointed or conical end which extends into a conical recess in the pendulum 6 to lock the pendulum 6 against movement.

In the operation of this brake equipment when it is desired to effect an application of the brakes, the brake controlling valve device, not shown, is operated to supply fluid under pressure to the pipe and passage G through which it flows to the chamber D, and the valve 8 being in the central position, fluid under pressure supplied to the chamber D may flow therefrom past the valve 8 to the passages C and E leading to the pipes A and B, which are connected to the brake cylinders 1 and 3, and 2 and 4, respectively.

In addition, fluid under pressure supplied to the chamber D may force the valves 15 and 17 away from their seats 19 and 20, respectively, and flow to the passages C and E leading to the brake cylinders.

On the supply of fluid under pressure to the chamber D fluid flows therefrom through the passage F, and on an increase in the pressure of the fluid in the chamber on the face of the piston 25 to a predetermined value, the piston 25 is moved downwardly against the spring 26, thereby moving the stem 27 out of the recess in the bottom of the pendulum 6 and releasing the pendulum 6.

Assuming that the vehicle is moving from right to left, as viewed in Fig. 1 of the drawing, on an increase in the pressure of the fluid in the brake cylinders of the vehicle the rate of speed of the vehicle will be retarded, but the pendulum 6, being freely suspended and being responsive to inertia, will tend to continue to move at the same rate.

As a result, therefore, the pendulum 6 will move relative to the body of the inertia operated valve device 5, and will press against the fulcrum point 14 on the valve 8 and move the valve 8 so as to press the sealing gasket 10 into engagement with the seat rib surrounding the end of the passage E, thereby cutting off communication from the chamber D and the passage E past the seat rib which is engaged by the sealing gasket 10.

When the pendulum 6 has moved the valve 8 to the position to cut off the supply of fluid directly from the chamber D to the passage E, fluid under pressure may continue to flow at the full pressure supplied to the passage G to the passage C and thereby to the pipe A leading to the brake cylinders 1 and 3 which control the brakes on the wheels on the leading axles of the vehicle trucks.

At the same time fluid under pressure supplied to the chamber D may flow therefrom to the passage E past the valve 15 which is yieldingly pressed towards the seat rib 19 by the coil spring 16. The pressure of the fluid supplied to the passage G and therefrom to the brake cylinders 2 and 4 will be less than that present in the chamber D, the difference depending upon the value of the spring 16.

The spring 16 is of such a value that the maximum pressure developed in the brake cylinders 2 and 4, which control the brakes on the trailing axles of the vehicle trucks, is such that the maximum retarding force on each wheel is substantially in accordance with the adhesion between the wheel and the rail under service conditions.

If the vehicle is brought to a complete stop, or if for any reason the rate of retardation of the vehicle is reduced so that the pendulum 6 is no longer actuated by inertia to hold the valve 8 in the position in which the sealing gasket 10 engages the seat rib surrounding the end of the passage E, direct communication between the chamber D and the passage E will be permitted and the pressures in the brake cylinders 1 and 3, and 2 and 4 may equalize.

If while the vehicle is still in motion and the rate of retardation of the vehicle is sufficient to cause the pendulum 6 to move the valve 8 to press the sealing gasket 10 against the seat rib surrounding the passage E, fluid under pressure is released from the passage G by operation of the brake controlling valve device, fluid will flow to the chamber D from the brake cylinders 1 and 3 by way of the pipe A, the passage C and past the seat rib surrounding the end of this passage which, at this time, is not engaged by the sealing gasket 9. In addition, fluid under pressure from the brake cylinders 1 and 3 may flow from the passage C past the ball check valve 21 and thence to the chamber D from which it may be released by way of the passage G.

At this time the valve means 8 is held in the position to press the sealing gasket 10 against the seat rib surrounding the end of the passage E and fluid under pressure cannot flow to the chamber D past this seat rib from the brake cylinders 2 and 4. However, fluid under pressure from these brake cylinders may flow by way of the pipe B and the passage E past the ball check valve 23, and thence to the chamber D from which it may flow to the passage and pipe G leading to the brake controlling valve device.

On a reduction in the rate of retardation of the vehicle, the pendulum is moved by gravity substantially to the position in which it is shown in Fig. 1 of the drawing, thereby moving the valve 8 away from the seat rib surrounding the end of the passage E so that thereafter communication is established between the passage E and the chamber D, while communication is maintained between the end of the passage C and the chamber D.

On movement of the valve 8 to the intermediate or normal position by the pendulum 6, all of the brake cylinders are in unrestricted communication with the chamber D and the pressures in the brake cylinders may equalize by the flow of fluid under pressure from the cylinders containing fluid under pressure at the higher pressure to the brake cylinders containing fluid under pressure at lower pressures. If fluid under pressure continues to be released through the passage G by the brake controlling valve device, the fluid which flows from the brake cylinders to the chamber D will flow to the atmosphere through the passage G.

When the pressure of the fluid in the chamber D is reduced fluid flows thereto from the chamber on the face of the piston 25, and on a reduction in the pressure of fluid in this chamber to a predetermined low value the force exerted by the fluid on the piston 25 is insufficient to maintain the piston against the spring 26, and the piston 25 and the stem 27 are thereupon moved by the spring 26 so that the end of the stem again extends into the conical recess in the pendulum 6 and locks it in the position in which it is shown.

If the vehicle is traveling in the opposite direction, that is from left to right, as viewed in Fig. 1 of the drawing, then on the supply of fluid under pressure to the passage G to effect the application of the brakes, fluid will flow therethrough to the chamber D and therefrom directly to the passages C and E leading to the pipes A and B which are connected to the brake cylinders 1 and 3, and 2 and 4, respectively.

On the initial supply of fluid under pressure to the chamber D, the pendulum 6 is held in the intermediate or neutral position by the locking means with the result that the valve 8 is in the position to permit communication between the chamber D and both of the passages C and E.

On an increase in the pressure of the fluid in the chamber D fluid under pressure flows therefrom through the passage F to the chamber on the face of the piston 25, and when this pressure has increased to a predetermined value, the force exerted by the fluid on the piston 25 is sufficient to overcome the opposing force of the spring 26, and the piston 25 and stem 27 are moved downwardly, thereby moving the stem out of the conical recess in the bottom of the pendulum 6.

On an increase in the pressure of the fluid in the brake cylinders of the vehicle, the rate of speed of the vehicle will be reduced, and if the rate of retardation of the vehicle increases to a predetermined value the pendulum 6, being responsive to inertia, will move relative to the body of the inertia operated valve device 5 and will press against the fulcrum point 13 and move the valve 8 so as to press the sealing gasket 9 against the seat rib surrounding the end of the passage C.

When the pendulum 6 has moved to this position the flow of fluid from the chamber D directly to the passage C is cut off, while the flow of fluid from the chamber D to the passage E is permitted. Fluid under pressure, therefore, may flow to the passage E and therethrough to the pipe B leading to the brake cylinders 2 and 4, which apply the brakes on the leading axles of the trucks of the vehicle, at the full pressure supplied to the chamber D by operation of the brake controlling valve device.

In this position of the pendulum 6 fluid under pressure may flow from the chamber D past the valve 17, which is moved away from the seat rib 20 against the spring 18. The pressure of the fluid supplied to the passage C, and therefrom by way of the pipe A to the brake cylinders 1 and 3, which control the brakes on the trailing axles of the vehicle trucks, will be less than that supplied to the brake cylinders 2 and 4, the difference depending upon the value of the spring 18, and this spring is proportioned to be of such value that the pressure of the fluid supplied to the brake cylinders 1 and 3 is in accordance with the adhesion between the wheels on the trailing axles and the rails under service conditions.

If the pressure of the fluid supplied to the passage G is reduced while the vehicle is still in motion fluid under pressure will flow from the brake cylinders 2 and 4 by way of the pipe B and the passage E directly to the chamber D from which it may flow to the passage G. In addition fluid under pressure may flow from the brake cylinders 2 and 4 through the passage E, past the ball check valve 23, and thence to the chamber D from which it may flow to the passage and pipe G.

During this reduction in the pressure of the fluid in the passage G, as the vehicle is still in motion, the pendulum 6 will be maintained in the position to hold the valve 8 so that the sealing gasket 9 engages the seat rib surrounding the end of the passage C so that fluid under pressure may not flow past this seat rib to the chamber D. However, fluid under pressure may flow from the brake cylinders 1 and 3 through the pipe A to the passage C, and thence past the ball check valve 21 to the chamber D from which it may flow to the passage G.

When the rate of retardation of the vehicle is decreased to a relatively low value, or if the vehicle is at rest, the pendulum 6 will move substantially to its intermediate or normal position and will move the valve 8 substantially to the position in which it is shown in Fig. 1 of the drawing, in which position the sealing gaskets 9 and 10 are out of engagement with the seat ribs surrounding the ends of passages C and E so that fluid under pressure from all of the brake cylinders may flow directly to the chamber D. The pressures in the different brake cylinders may then equalize by flow through the chamber D.

On a reduction in the pressure of the fluid in the chamber D there is a similar reduction in the pressure of the fluid in the chamber on the face of the piston 25, and when this pressure has reduced to a predetermined relatively low value the force exerted by this fluid on the piston 25 is insufficient to maintain the piston against the opposing force of the spring 26 and the piston 25 and stem 27 will be moved upwardly so that the pointed end of the stem again extends into the conical recess in the pendulum 6, so as to maintain the pendulum 6 in the normal position.

It will be seen that the brake equipment provided by this invention incorporates means responsive to the direction of movement of the vehicle for varying the braking effect produced on the leading and trailing wheels of each of the trucks of the vehicles.

It will be seen further that the brake equipment provided by this invention includes separate brake cylinders for the shoes associated with the wheels at the opposite ends of the vehicle trucks and that there is means responsive to the direction of movement of the vehicle and to retardation of the vehicle for varying the pressure developed in the brake cylinders in accordance with the direction of travel of the vehicle.

In Fig. 2 of the drawing I have illustrated a modified form of brake equipment embodying my invention. The brake equipment operates not only to vary the degree of application of the brakes on the leading and trailing wheels of each of the vehicle trucks, but also to vary the degree of application of the brakes on the corresponding axles of each of the vehicle trucks in order to compensate for the shifting of weight from one truck of the vehicle to the other truck during retardation of the vehicle.

The brake equipment shown in Fig. 2 of the drawing is similar to that shown in Fig. 1 and has brake cylinders 1 and 3 which are arranged to control the brakes on the wheels of the axles on one end of each of the vehicle trucks and, in addition, has brake cylinders 2 and 4 which are adapted to control the brakes on the wheels of the axles on the other end of each of the vehicle trucks.

This system also includes an inertia operated valve device 5 to which fluid under pressure is supplied to and from which fluid under pressure is released by operation of a brake controlling valve device, not shown.

The inertia operated valve device 5 has a passage therein corresponding to the passage G in the device shown in Fig. 1 of the drawing and through which fluid under pressure is supplied to and released from the valve device by operation of the brake controlling valve device, not shown.

The inertia operated valve device 5 has a passage therein corresponding to the passage E in the device shown in Fig. 1, and which is connected to the passage corresponding to the passage G in a similar inertia operated valve device 5a which controls the supply of fluid to the brake cylinders 2 and 4 which control the application of the brakes on the axles on the ends of the vehicle trucks adjacent one end of the vehicle.

The inertia operated valve device 5 has, in addition, a passage therein corresponding to the passage C in the valve device shown in Fig. 1 of the drawing, and which is connected to the passage corresponding to the passage G in another similar inertia operated valve device 5b which is connected by suitable pipes to the brake cylinders 1 and 3 which control the application of the brakes on the wheels adjacent the other ends of the vehicle trucks.

In the operation of this brake equipment on the supply of fluid under pressure by the brake controlling valve device, not shown, to the inertia operated valve device 5, fluid under pressure initially flows directly to the subsidiary inertia operated valve devices employed in the equipment at the full pressure of the fluid supplied to the inertia operated valve device 5, while the fluid supplied to each of the subsidiary inertia operated valve devices flows therefrom to the brake cylinders associated therewith at the full pressure of the fluid supplied thereto.

When the rate of retardation of the vehicle increases to a predetermined value, providing the pressure of the fluid supplied to the brake cylinders has increased to a value high enough to effect the release of the locking means associated with the various inertia operated valve devices, the inertia operated valve device 5 operates in the manner described in detail above to reduce the pressure of the fluid supplied to one of the subsidiary inertia operated valve devices, the one affected being determined by the direction of movement of the vehicle.

Each of the subsidiary inertia operated valve devices thereupon operates to permit fluid under pressure to flow to one of the brake cylinders at the full pressure of the fluid supplied thereto, and to reduce the pressure of the fluid supplied to the other of the brake cylinders controlled thereby. This results in the development of different pressures in the brake cylinders associated with the leading and trailing wheels on each of the trucks of the vehicle, and, in addition, results in a difference in the pressures developed in the corresponding brake cylinders of the different vehicle trucks. Because of this difference in the pressure in the corresponding brake cylinders of the different vehicle trucks a different braking effect will be produced on each of the vehicle trucks, and this may be accurately adjusted to compensate for the difference in adhesion of the wheels of each of the trucks which results from the transfer of weight from one of the vehicle trucks to the other during a stop.

After the vehicle has been brought to a stop, or its rate of retardation has decreased to a low value, the inertia responsive members of the inertia operated valve devices move to their normal positions and thereby permit unrestricted communication between the brake cylinders and the various inertia operated valve devices so that the pressure of the fluid in the different brake cylinders equalizes.

On operation of the brake controlling valve device to release fluid under pressure, the inertia operated valve devices operate as described in detail above to permit the flow of fluid from the brake cylinders.

It will be seen, therefore, that this brake equipment incorporates means responsive to the direction of movement of the vehicle for automatically varying the braking effect not only on the different wheels of each of the vehicle trucks, but also between each of the trucks of the vehicle in order to compensate for the shifting of weight between the vehicle trucks which occurs during retardation of the vehicle.

While one form of inertia operated valve device provided by my invention together with two forms of brake equipments employing this valve device have been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a passage through which fluid may be supplied to the braking means, and a device responsive to retardation of the vehicle for controlling the pressure of the fluid supplied to one of said means by said supply means.

2. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting application of the brakes on wheels of the vehicle more remote from said end of the vehicle that the first named wheels, supply means for supplying fluid under pressure to a passage through which fluid may be supplied to said means, an inertia responsive member responsive to retardation of the vehicle and to the direction of movement of the vehicle for controlling the pressure of the fluid supplied to one of said means by said supply means, an element normally rendering said inertia responsive member inoperative, and means subject to and operated on a predetermined increase in the pressure of the fluid in said passage for releasing said element.

3. In a fluid pressure brake equipment for a vehicle having a series of wheels, in combination, means operative on an increase in fluid pressure for effecting the application of the brakes on a wheel adjacent one end of the vehicle, other means operative on an increase in fluid pressure for effecting the application of the brakes on a wheel more remote from said end of the vehicle and the first named wheel, supply means for supplying fluid under pressure to a chamber from which fluid may be supplied to said means, and a device responsive to retardation of the vehicle and to the direction of movement of the vehicle for controlling the supply of fluid under pressure from said chamber to said means.

4. In a fluid pressure brake equipment for a vehicle having a series of wheels, in combination, means operative on an increase in fluid pressure for effecting the application of the brakes on a wheel adjacent one end of the vehicle, other means operative on an increase in fluid pressure for effecting the application of the brakes on a wheel more remote from said end of the vehicle and the first named wheel, supply means for supplying fluid under pressure to a chamber from which fluid may be supplied to said means, an inertia responsive member responsive to retardation of the vehicle and to the direction of movement of the vehicle for controlling the supply of fluid under pressure from said chamber to said means, an element for normally rendering said inertia responsive member inoperative, and means subject to the pressure of the fluid supplied to said chamber for releasing said element.

5. In a fluid pressure brake equipment for a vehicle having a series of wheels, in combination, means operative on an increase in fluid pressure for effecting the application of the brakes on wheels of the vehicle, supply means for supplying fluid under pressure to a chamber from which fluid may be supplied to said means, valve means controlling a communication from said chamber to said means, a member responsive to retardation of the vehicle for operating said valve means, and a valve device operated on a predetermined difference in the pressure in said chamber and in said means for supplying fluid under pressure to said means.

6. In a fluid pressure brake equipment for a vehicle having a series of wheels, in combination, means operative on an increase in fluid pressure for effecting the application of the brakes on wheels of the vehicle, supply means for supplying fluid under pressure to a chamber from which fluid may be supplied to said means, valve means controlling a communication from said chamber to said means, means responsive to retardation of the vehicle for operating said valve means, and a valve device operated on a predetermined difference in the pressure in said chamber and in said means for supplying fluid under pressure from said chamber to said means.

7. In a fluid pressure brake equipment for a vehicle having a series of wheels, in combination, means operative on an increase in fluid pressure for effecting application of the brakes on wheels of the vehicle, supply means for supplying fluid under pressure to a chamber from which fluid may be supplied to said means, valve means controlling a communication from said chamber to said means, a member operative on movement of the vehicle in one direction and responsive to retardation of the vehicle for controlling said valve means, and a valve device operative on a predetermined difference in the pressure in said chamber and in said means for supplying fluid under pressure to the said means.

8. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a passage from which fluid may be supplied to said means, valve means controlling the supply of fluid from said passage to said means, said valve means having a normal position and being operative on movement therefrom in one direction to cut off the supply of fluid from said passage to one of said means and to permit the supply of fluid to the other of said means and being operative on movement from the normal position in the other direction to cut off the supply of fluid from said passage to said other means and to permit the supply of fluid to the first named means, and a member responsive to the direction of travel of the vehicle for operating said valve means.

9. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a passage from which fluid may be supplied to said means, valve means controlling the supply of fluid from said passage to the said means, said valve means having a normal position and being operative on movement therefrom in one direction to cut off the supply of fluid from said passage to one of said means and to permit the supply of fluid to the other of said means and being operative on movement from the normal position in the other direction to cut off the supply of fluid from said passage to said other means and to permit the supply of fluid to the first named means, and a member responsive to the direction of travel of the vehicle for operating said valve means, each of said means having a device associated therewith and operative upon an increase in the pressure of the fluid in said passage to a predetermined value in excess of the pressure of the fluid in the said means for supplying fluid under pressure from said passage to the said means.

10. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a passage from which fluid may be supplied to said means, valve means controlling the supply of fluid from said passage to the said means, said valve means having a normal position and being operative on movement therefrom in one direction to cut off the supply of fluid from said passage to one of said means and to permit the supply of fluid to the other of said means and being operative on movement from the normal position in the other direction to cut off the supply of fluid from said passage to said other means and to permit the supply of fluid to the first named means, and a member responsive to retardation of the vehicle for operating said valve means.

11. In a fluid pressure brake equipment for a vehicle having a series of wheels, in combination, means operative on an increase in fluid pressure for effecting the application of the brakes on the wheels adjacent one end of the vehicle, means operative on an increase in fluid pressure for effecting the application of the brakes on wheels of the vehicle more remote from said end of the vehicle than the first named wheels, supply means for supplying fluid under pressure to a passage from which fluid may be supplied to said means, valve means controlling the supply of fluid from said passage to the said means, said valve means having a normal position and being operative on movement therefrom in one direction to cut off the supply of fluid from said passage to one of said means and to permit the supply of fluid to the other of said means and being operative on movement from the normal position in the other direction to cut off the supply of fluid from said passage to said other means and to permit the supply of fluid to the first named means, and a member responsive to the direction of movement and to retardation of the vehicle for operating said valve means.

12. In a fluid pressure brake equipment for a vehicle having a series of wheels, in combination, means operative on an increase in fluid pressure for effecting the application of the brakes on the wheels adjacent one end of the vehicle, means operative on an increase in fluid pressure for effecting the application of the brakes on wheels of the vehicle more remote from said end of the vehicle than the first named wheels, supply means for supplying fluid under pressure to a passage from which fluid may be supplied to said means, valve means controlling the supply of fluid from said passage to the said means, said valve means having a normal position and being operative on movement therefrom in one direction to cut off the supply of fluid from said passage to one of said means and to permit the supply of fluid to the other of said means and being operative on movement from the normal position in the other direction to cut off the supply of fluid from said passage to said other means and to permit the supply of fluid to the first named means, a member responsive to retardation of the vehicle for operating the valve means, an element normally rendering said member inoperative, and means subject to and operated on a predetermined increase in the pressure of the fluid in said passage for releasing said element.

13. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a supply passage from which fluid may be supplied to said means, a member responsive to retardation of the vehicle and having a normal position, valve means operated by movement of said member from the normal position in one direction for supplying fluid under pressure from the supply passage to one of said means and to cut off the supply of fluid to the other of said means, valve means operated by movement of said member from the normal position in the other direction for supplying fluid under pressure from said supply passage to said other means and for cutting off the supply of fluid to the first named means.

14. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a supply passage from which fluid may be supplied to said application means, a member responsive to retardation of the vehicle and having a normal position, valve means operated by movement of said member from the normal position in one direction for supplying fluid under pressure from the supply passage to one of said means and to cut off the supply of fluid to the other of said means, valve means operated by movement of said member from the normal position in the other direction for supplying fluid under pressure from said supply passage to said other means and for cutting off the supply of fluid to the first named means, each of said means having a device associated therewith and operative on an increase in the pressure of the fluid in said passage to a predetermined value in excess of the pressure of the fluid in the said means for supplying fluid under pressure to said means.

15. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a supply passage from which fluid may be supplied to said means, a member responsive to the direction of movement of the vehicle and having a normal position, valve means operated by movement of said member from the normal position in one direction for supplying fluid under pressure from the supply passage to one of said means and to cut off the supply of fluid to the other of said means, and valve means operated by movement of said member from the normal position in the other direction for supplying fluid under pressure from said supply passage to said other means and for cutting off the supply of fluid to the first named means.

16. In a fluid pressure brake equipment for a vehicle having a series of wheels, in combination, means operative on an increase in fluid pressure for effecting the application of the brakes on the wheels adjacent one end of the vehicle, other means operative on an increase in fluid pressure for effecting the application of the brakes on wheels of the vehicle more remote from said end of the vehicle than the first named wheels, supply means for supplying fluid under pressure to a supply passage from which fluid may be supplied to said means, a member responsive to the direction of movement of the vehicle and to retardation of the vehicle and having a normal position, valve means operated by movement of said member from the normal position in one direction for supplying fluid under pressure from the supply passage to one of said means and to cut off the supply of fluid to the other of said means, and valve means operated by movement of said member from the normal position in the other direction for supplying fluid under pressure from said supply passage to said other means and for cutting off the supply of fluid to the first named means.

17. In a fluid pressure brake equipment for a car having a series of wheels, in combination, brake control means operative on an increase in fluid pressure for effecting the application of the brakes on the wheels adjacent one end of the vehicle, other brake control means operative on an increase in fluid pressure for effecting the application of the brakes on wheels of the vehicle more remote from said end of the vehicle than the first named wheels, means for supplying fluid under pressure to and for releasing fluid under pressure from a passage through which fluid under pressure may be supplied to and released from said brake control means, valve means responsive to retardation of the vehicle for controlling the supply of fluid under pressure from said passage to one of said brake control means, a communication between said brake control means and said passage and by-passing said valve means, and a check valve operative to permit fluid to flow from the said brake control means to said passage and to prevent the flow of fluid from said passage to the said brake control means through said communication.

18. In a fluid pressure brake equipment for a vehicle having a series of pairs of wheels, in combination, brake control means operative on an increase in fluid pressure for effecting the application of the brakes on the wheels adjacent one end of the vehicle, other brake control means operative on an increase in fluid pressure for effecting the application of the brakes on wheels of the vehicle more remote from said end of the vehicle than the first named wheels, means for supplying fluid under pressure to and for releasing fluid under pressure from a passage through which fluid under pressure may be supplied to and released from said brake control means, valve means responsive to the direction of movement of the vehicle for controlling the supply of fluid under pressure from said passage to the said brake control means, each of said brake control means having associated therewith a communication extending between the said brake control means and said passage and by-passing the valve means, each of said communications having a check valve associated therewith and operative to permit fluid to flow from the said brake control means to said passage and to prevent the flow of fluid from said passage to the said brake control means through said communication.

19. In a fluid pressure brake equipment for a vehicle having a series of wheels, in combination, brake control means operative on an increase in fluid pressure for effecting the application of the brakes on the wheels adjacent one end of the vehicle, means for supplying fluid under pressure to and for releasing fluid under pressure from a passage through which fluid under pressure may be supplied to and released from said brake control means, valve means operative on an increase in the pressure of the fluid in said passage to a predetermined value above the pressure of the fluid in said brake control means for supplying fluid under pressure from said passage to said brake control means, a communication between said brake control means and said passage, a check valve interposed in said communication and operative to permit fluid to flow from said brake control means to said passage and to prevent the flow of fluid from said passage to the brake control means through said communication, and means responsive to the direction of movement of the vehicle for supplying fluid under pressure from said passage to said brake control means.

20. In a fluid pressure brake equipment for a vehicle having a series of wheels, in combination, brake control means operative on an increase in fluid pressure for effecting the application of the brakes on the wheels adjacent one end of the vehicle, means for supplying fluid under pressure to and for releasing fluid under pressure from a passage through which fluid under pressure may be supplied to and released from the said brake control means, valve means operative on an increase in the pressure of the fluid in said passage to a predetermined value above the pressure of the fluid in the brake control means for supplying fluid under pressure from said passage to the brake control means, a communication between said brake control means and said passage, a check valve interposed in said communication and operative to permit fluid to flow from the brake control means to said passage and to prevent the flow of fluid from said passage to the brake control means through said communication, and means responsive to retardation of the vehicle for supplying fluid under pressure from said passage to the brake control means.

21. In a fluid pressure brake equipment for a vehicle having a series of wheels, in combination, means operative on an increase in fluid pressure for effecting the application of the brakes on the wheels adjacent one end of the vehicle, means for supplying fluid under pressure to and for releasing fluid under pressure from a passage through which fluid under pressure may be supplied to and released from the brake control means, valve means operative on an increase in the pressure of the fluid in said passage to a predetermined value above the pressure of the fluid in the brake control means for supplying fluid under pressure from said passage to the brake control means, a communication between said brake control means and said passage, a check valve interposed in said communication and operative to permit fluid to flow from the brake control means to said passage and to prevent the flow of fluid from said passage to the brake control means through said communication, and means responsive to the direction of movement of the vehicle and to retardation of the vehicle for supplying fluid under pressure from said passage to the brake control means.

22. In a fluid pressure brake equipment for a vehicle having a body supported adjacent each end by means of trucks, each of said trucks having a pair of axles carrying wheels adapted to support the vehicle, braking means operative on an increase in fluid pressure for effecting the application of the brakes on the wheels of the axles of each of said trucks adjacent one end of the vehicle, other braking means operative on an increase in fluid pressure for effecting the application of the brakes on the wheels of the axles of each of said trucks adjacent the other end of the vehicle, and means responsive to the direction of movement of the vehicle for controlling the supply of fluid under pressure to said braking means.

23. In a fluid pressure brake equipment for a vehicle having a body supported adjacent each end by means of trucks, each of said trucks having a pair of axles carrying wheels adapted to support the vehicle, braking means operative on an increase in fluid pressure for effecting the application of the brakes on the wheels of the axles of each of said trucks adjacent one end of the vehicle, other braking means operative on an increase in fluid pressure for effecting the application of the brakes on the wheels of the axles of each of said trucks adjacent the other end of the vehicle, and means responsive to retardation of the vehicle for controlling the supply of fluid under pressure to said braking means.

24. In a fluid pressure brake equipment for a vehicle having a body supported adjacent each end by means of trucks, each of said trucks having a pair of axles carrying wheels adapted to support the vehicle, braking means operative upon an increase in fluid pressure for effecting the application of the brakes on the wheels of the axles of each of said trucks adjacent one end of the vehicle, other braking means operative on an increase in fluid pressure for effecting the application of the brakes on the wheels of the axles of each of said trucks adjacent the other end of the vehicle, means for supplying fluid under pressure to a passage through which fluid under pressure may be supplied to each of said braking means, and means responsive to the direction of movement of the vehicle for restricting the pressure of the fluid supplied from said passage to one of said braking means.

25. In a fluid pressure brake equipment for a vehicle having a body supported adjacent each end by means of trucks, each of said trucks having a pair of axles carrying wheels adapted to support the vehicle, braking means operative upon an increase in fluid pressure for effecting the application of the brakes on the wheels of the axles of each of said trucks adjacent one end of the vehicle, other braking means operative on an increase in fluid pressure for effecting the application of the brakes on the wheels of the axles of each of said trucks adjacent the other end of the vehicle, means for supplying fluid under pressure to a passage through which fluid under pressure may be supplied to each of said braking means, and valve means responsive to the direction of movement of the vehicle for controlling the supply of fluid from said passage to said braking means, each of said braking means having associated therewith valve mechanism operative on an increase in the pressure of the fluid in said passage to a predetermined value above the pressure of the fluid in the said braking means for supplying fluid under pressure from said passage to said braking means.

26. In a fluid pressure brake equipment for a vehicle having a body supported adjacent each end by means of trucks, each of said trucks having a pair of axles carrying wheels adapted to support the vehicle, braking means operative upon an increase in fluid pressure for effecting the application of the brakes on the wheels of the axles of each of said trucks adjacent one end of the vehicle, other braking means operative on an increase in fluid pressure for effecting the application of the brakes on the wheels of the axles of each of said trucks adjacent the other end of the vehicle, means for supplying fluid under pressure to a passage through which fluid under pressure may be supplied to each of said braking means, valve means responsive to the direction of movement of the vehicle for supplying fluid under pressure from said passage to said braking means, each of said braking means having associated therewith a communication connected with said passage and by-passing said valve means, each of said communications having a check valve interposed therein and adapted to permit fluid to flow from the braking means to said passage and to prevent the flow of fluid from said passage to the braking means.

27. In a fluid pressure brake equipment for a vehicle having a body supported adjacent each end by means of trucks, each of said trucks having a pair of axles carrying wheels adapted to support the vehicle, each of said axles having associated therewith braking means operative on an increase in fluid pressure for effecting an application of the brakes on said axle, means for supplying fluid under pressure to a supply passage through which fluid under pressure may be supplied to said braking means, means responsive to the direction of movement of the vehicle for controlling the flow of fluid from said supply passage to branch passages, means responsive to the direction of movement of the vehicle for controlling the flow of fluid under pressure from one of said branch passages to the braking means associated with the axle on one of the trucks adjacent one end of the vehicle and to the axle on the other truck adjacent the same end of the vehicle, and other means responsive to the direction of movement of the vehicle for controlling the flow of fluid under pressure from the other one of said branch passages to the braking means associated with the other of the said axles.

JOSEPH WHITE.